March 17, 1931.  W. F. KEARNEY  1,797,092
DEVICE FOR PROPELLING BABY CARRIAGES
Filed Nov. 18, 1929
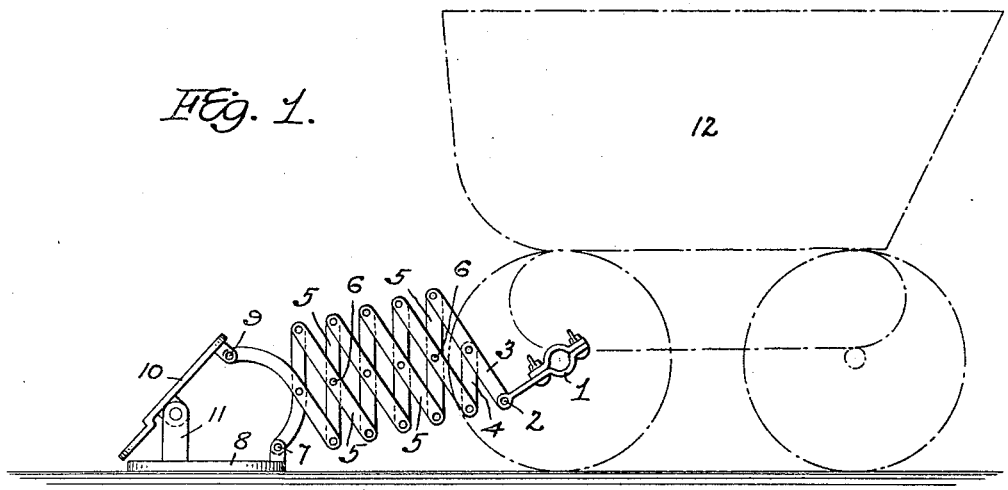
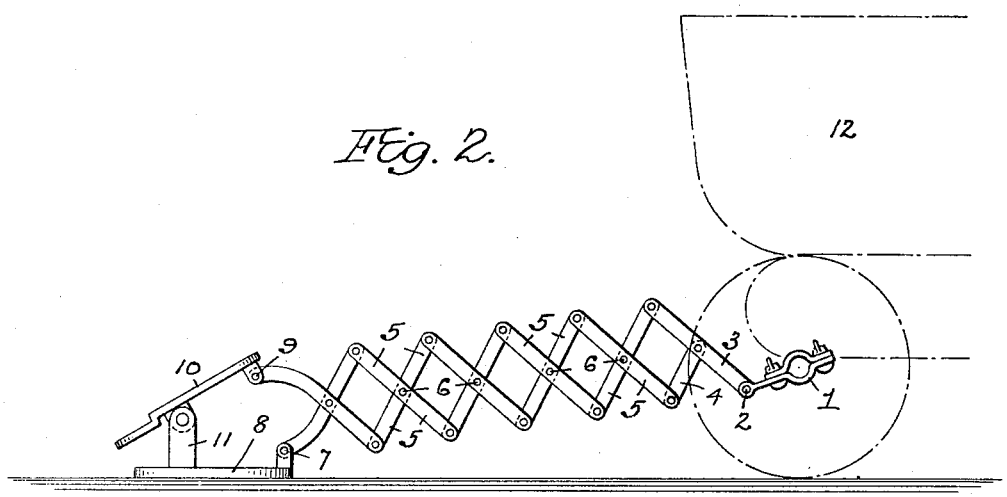
William F. Kearney
INVENTOR
BY Victor J. Evans
ATTORNEY
WITNESS Patented Mar. 17, 1931

1,797,092

UNITED STATES PATENT OFFICE

WILLIAM F. KEARNEY, OF NEW ORLEANS, LOUISIANA

DEVICE FOR PROPELLING BABY CARRIAGES

Application filed November 18, 1929. Serial No. 408,149.

The object of this, my present invention, is the provision of a simple means whereby a motor or nurse may be comfortably seated and propel an infant reposing in a baby carriage backward and forward to determined extents by simply operating a foot pedal, so that the infant will be quieted and the mother or nurse may knit or read while comfortably seated.

A further object is the provision of a means for this purpose in the nature of pivotally connected crossed links that constitute a lazy tongs system, one end of which being clamped to the front or rear axle of the baby carriage, one of the links at the second end being pivoted to the support, the second link at the said end being pivotally secured to the foot pedal which is in turn connected to the base, whereby the operator oscillating the pedal will propel the baby carriage both forwardly and backwardly.

To the attainment of the foregoing the invention consists in the improvement hereinafter described and definitely claimed.

In the drawings:

Figure 1 is a side elevation of the improvement, the cross links or lazy tongs being collapsed.

Figure 2 is a similar view with the crossed links or lazy tong system expanded.

To either the front or rear axle of a baby carriage I fix a clamp 1 comprising two sections which are suitably bolted together or otherwise detachably connected. One of the clamp sections has an arm extension which is pivoted, as at 2, to one end of a link 3. This link has centrally pivoted thereto a short link 4, and to the ends of the links 3 and 4 there are pivotally secured any desired number of crossed links 5 which in turn are centrally pivoted, as at 6. The crossed links provide a lazy tong system and one of the links comprising the end of the lazy tong system opposite the link 3 which is connected to the clamp is pivoted, as at 7, to an upstanding lug on the weighted base 8. The second link at this end of the lazy tong system is preferably arched and is pivoted, as at 9, to a lug on a foot pedal 10. The foot pedal has its under face provided with a lug which is pivoted to an upstanding arm 11 on the base 8. The pedal 10 is provided with both a foot and a heel portion.

It will be apparent that with a simple construction as above described a mother or nurse will be comfortably seated in a chair adjacent the foot pedal 10 and by placing one foot upon the said pedal will rock the same to expand and contract the links constituting the lazy tong system and consequently move the baby carriage 12 toward or away from the base 8. This reciprocatory movement of the carriage 12 will soothe the infant therein with the least amount of exertion upon the part of the operator.

The simplicity of the construction and the advantages thereof will, it is thought, be apparent to those skilled in the art to which such invention relates without further detailed description.

Having described the invention, I claim:

A lazy tong system having one of its end links pivotally secured to an arm on a clamp, which clamp is designed to be clamped on the axle of a baby carriage, a weighted base, one of the links of the second end of the lazy tong system being pivotally secured to the base, an arm arising from the base, a foot pedal pivoted thereto and a pivotal connection between the foot pedal and the second link at the said end of the lazy tong system.

In testimony whereof I affix my signature.

WILLIAM F. KEARNEY.